(12) United States Patent
Henry et al.

(10) Patent No.: US 11,044,160 B2
(45) Date of Patent: Jun. 22, 2021

(54) LOCATION-AWARE POLICY EXCHANGE

(71) Applicant: Cisco Technology, Inc., San Jose, CA (US)

(72) Inventors: Jerome Henry, Pittsboro, NC (US); Indermeet S. Gandhi, Bangalore (IN); Robert E. Barton, Richmond (CA); Vishal S. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 16/362,498

(22) Filed: Mar. 22, 2019

(65) Prior Publication Data

US 2020/0304372 A1    Sep. 24, 2020

(51) Int. Cl.
| | |
|---|---|
| *H04L 12/24* | (2006.01) |
| *H04W 28/02* | (2009.01) |
| *H04W 76/27* | (2018.01) |
| *H04W 4/02* | (2018.01) |
| *H04W 28/16* | (2009.01) |
| *H04W 84/12* | (2009.01) |

(52) U.S. Cl.
CPC .......... *H04L 41/0893* (2013.01); *H04W 4/02* (2013.01); *H04W 28/0268* (2013.01); *H04W 28/16* (2013.01); *H04W 76/27* (2018.02); *H04W 84/12* (2013.01)

(58) Field of Classification Search
None
See application file for complete search history.

(56) References Cited

U.S. PATENT DOCUMENTS

| | | | |
|---|---|---|---|
| 9,668,101 B2 | 5/2017 | Marri Sridhar et al. | |
| 9,763,073 B2 | 9/2017 | Segev et al. | |
| 9,769,626 B2 | 9/2017 | Bajko et al. | |
| 10,009,430 B2 | 6/2018 | Eyal et al. | |
| 2013/0041981 A1* | 2/2013 | Kim | H04W 48/16 709/217 |
| 2014/0094142 A1* | 4/2014 | Torres | H04W 12/068 455/411 |
| 2015/0156079 A1* | 6/2015 | Satterlee | H04L 41/0893 709/223 |
| 2017/0019835 A1 | 1/2017 | Lee et al. | |
| 2020/0015041 A1* | 1/2020 | Cariou | H04W 4/02 |

OTHER PUBLICATIONS

Nuggehalli et al, "LTE-WLAN aggregation [Industry Perspectives]," IEEE Wireless Communications ( vol. 23 , Issue: 4 , Aug. 2016 ).

* cited by examiner

*Primary Examiner* — Adnan Baig
(74) *Attorney, Agent, or Firm* — Patterson + Sheridan, LLP

(57) ABSTRACT

Techniques for policy exchange are provided. A wireless local area network (WLAN) system configures a first policy to apply to devices connecting to the WLAN system, where the first policy is associated with a first event context. The WLAN system then transmits, to a cellular system, the first event context and an indication of the first policy. The WLAN system further receives a first connection from a first user equipment (UE). Finally, The WLAN system transmits a first response to the first UE specifying the first event context, where the cellular system, upon receiving the first event context from the first UE, identifies and applies the first policy based on the first event context.

20 Claims, 6 Drawing Sheets

LOCATION-AWARE POLICY EXCHANGE

TECHNICAL FIELD

Embodiments presented in this disclosure generally relate to network policies. More specifically, embodiments disclosed herein relate to enforcing temporal and spatial policies in networks.

BACKGROUND

Modern telecommunications have evolved to allow improved connectivity and quality in a number of ways. Some networks define and enforce policies relating to Quality of Service (QoS) received by client devices. These policies can be used, for example, to give higher priority to certain traffic, certain devices, or particular users. Existing policies are fairly rigid, and often do not provide important context that should be considered when enforcing the policy. Additionally, as client devices connect to multiple networks, consistent policy enforcement becomes exceedingly difficult, as each network provider is generally entirely unaware of the contexts and policies that are relevant to the other providers.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
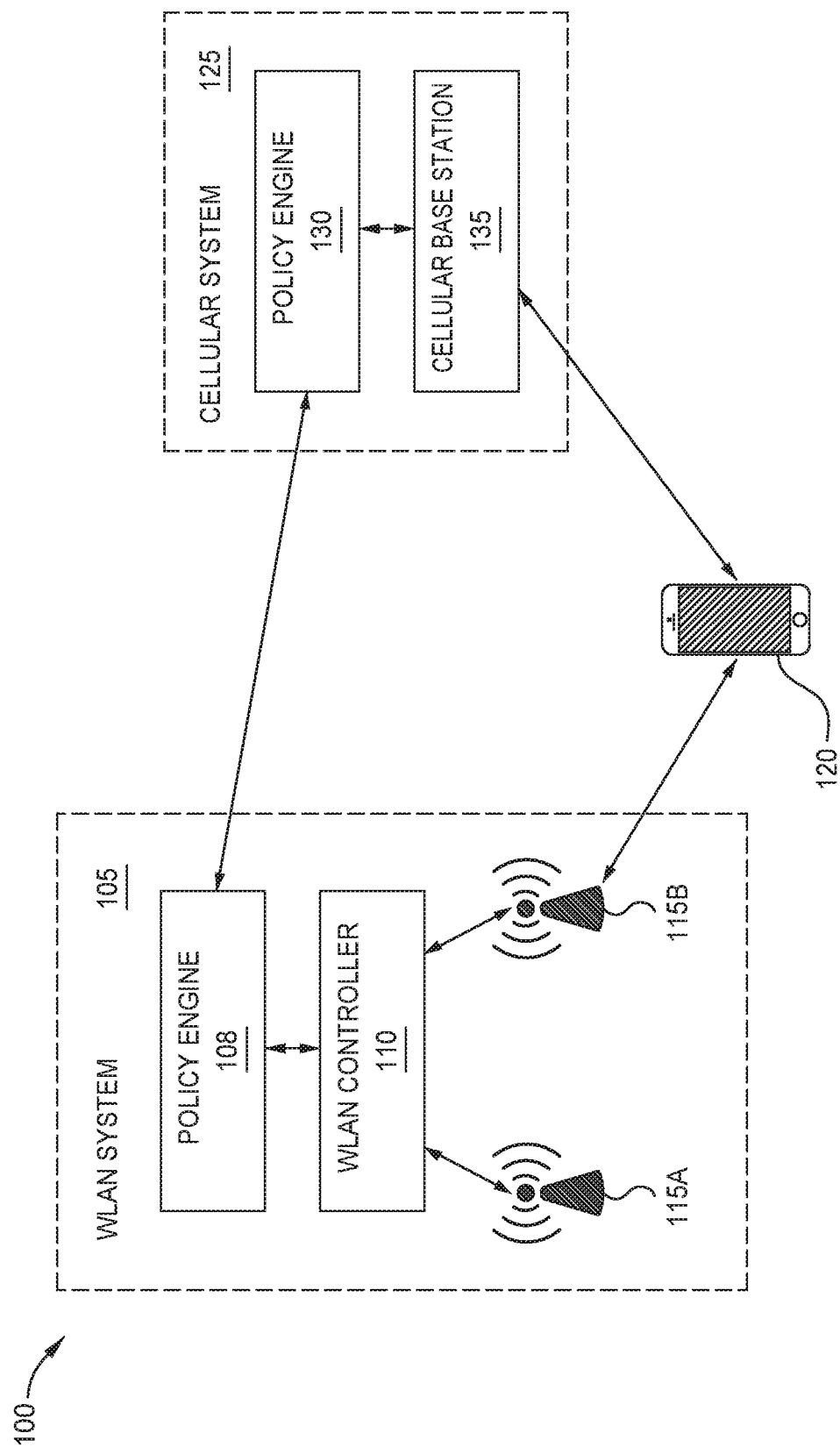
FIG. 1 illustrates an environment configured to enable sharing and enforcement of spatial and temporal contexts and policies, according to one embodiment disclosed herein.

According to one embodiment presented in this disclosure, a method is provided. The method includes configuring, by a wireless local area network (WLAN) system, a first policy to apply to devices connecting to the WLAN system, wherein the first policy is associated with a first event context. The method further includes transmitting, by the WLAN system, to a cellular system, the first event context and an indication of the first policy. Additionally, the method includes receiving, by the WLAN system, a first connection from a first user equipment (UE). Finally, the method includes transmitting, by the WLAN system, a first response to the first UE specifying the first event context, wherein the cellular system, upon receiving the first event context from the first UE, identifies and applies the first policy based on the first event context.

According to a second embodiment presented in this disclosure, a computer product is provided. The computer program product includes logic encoded in a non-transitory medium, the logic executable by operation of one or more computer processors to perform an operation. The operation includes configuring, by a first network system, a first policy to apply to devices connecting to the first network system, wherein the first policy is associated with a first event context. The operation further includes transmitting, by the first network system, to a second network system, the first event context and an indication of the first policy. Additionally, the operation includes receiving, by the first network system, a first connection from a first user equipment (UE). Finally, the operation includes transmitting, by the first network system, a first response to the first UE specifying the first event context, wherein the second network system, upon receiving the first event context from the first UE, identifies and applies the first policy based on the first event context.

According to a third embodiment presented in this disclosure, a system is provided. The system includes one or more computer processors, and logic encoded in a non-transitory medium. The logic is executable by operation of the one or more computer processors to perform an operation including configuring, by a wireless local area network (WLAN) system, a first policy to apply to devices connecting to the WLAN system, wherein the first policy is associated with a first event context. The operation further includes transmitting, by the WLAN system, to a cellular system, the first event context and an indication of the first policy. Additionally, the operation includes receiving, by the WLAN system, a first connection from a first user equipment (UE). Finally, the operation includes transmitting, by the WLAN system, a first response to the first UE specifying the first event context, wherein the cellular system, upon receiving the first event context from the first UE, identifies and applies the first policy based on the first event context.

Example Embodiments

Embodiments of the present disclosure enable improved enforcement of network policies. In some embodiments, policies can be associated with temporal and/or spatial or geographic contexts, which define how the policy should be applied to ensure the goals of the network provider(s) are met. For example, in order to increase the number of customers visiting a shopping center, the local Wi-Fi link may be configured with a policy that assigns higher priority to network traffic associated with particular applications, as compared to other applications that do not serve to encourage users to visit the center. In some embodiments, these policies are associated with the geographic or spatial context (e.g., the area served by the Wi-Fi link). In one embodiment, the geographic context is further limited to a portion of the local network (e.g., to certain access points within certain area(s) of the shopping center).

Additionally, in some embodiments of the present disclosure, the policies can be assigned a temporal context that defines when the policy is to be enforced. For example, some traffic may be prioritized during the afternoon, while other traffic is prioritized during evening or morning hours. In one embodiment, policies can be configured and associated with particular events (such as a keynote address, a concert, and the like). For example, at a trade show, a policy may have an event context specifying that it should be applied to client devices that are connected to the access point(s) within the main conference room, during the scheduled time of the main speaker's keynote.

Notably, although policies can be configured and enforced by the Wireless Local Area Network (WLAN) system (e.g., the Wi-Fi link), users can simply disconnect from this WLAN link or utilize another network (e.g., another WLAN link or a cellular system) and thereby bypass the desired policies. Further, with increasing adoption of 5G technology, user equipment (UE) such as laptops and mobile telephones may connect to the WLAN system, the cellular system, or to both systems simultaneously. In such an embodiment, the UE may route traffic to the WLAN system and cellular system dynamically, based on load, bandwidth, cost, latency, and the like. However, using existing solutions, the traffic being routed via the cellular system will not be subject to the policies configured on the WLAN system. Similarly, any policies applied by the cellular system are not applied to traffic being sent via the WLAN system. As used herein, a cellular system generally includes any mobile network, such as Long-Term Evolution (LTE) systems, 5G systems, 4G systems, 3G transitional systems, 3G systems, 2G transitional systems, 2G systems, 1G systems, and the like.

In embodiments, a WLAN system can determine the location of the UE within the geographic area served by the system, such as by identifying the access point(s) (APs) the UE is connected to. Although this can allow selective enforcement of policies based on the user's location, this geographic information is not visible to the cellular system providers. Further, other options such as use of a global positioning system (GPS) often suffer inaccuracies and unreliability, particularly if the UE is within a building or structure. Embodiments of the present disclosure provide an exchange mechanism that enables contextual values, which may include spatial and temporal data and policies, to be shared between network providers (e.g., WLAN system(s) and cellular system(s)). This enables the policies to be applied uniformly across the links when desired. Further, in some embodiments, the links can be configured with complementary policies, to improve the experience of the user. In embodiments, WLAN systems may also be referred to as enterprise systems or as unlicensed systems. Similarly, cellular systems may also referred to as licensed systems.

FIG. 1 illustrates an environment 100 configured to enable sharing and enforcement of spatial and temporal contexts and policies, according to one embodiment disclosed herein. In embodiments, the UE 120 connects to the WLAN System 105 and receives a variety of data which may include civic information, location information, event context, and the like. In various embodiments, this information is then conveyed by the UE 120 to the Cellular System 125. In embodiments, the Cellular System 125 then identifies one or more appropriate policies to apply, based on this context (e.g., based on the location of the WLAN System 105 and/or the UE 120, and the temporal context of the request). In some embodiments, the Cellular System 125 may request the policy information from the WLAN System 105 or from a centralized policy repository or engine. In one embodiment, the WLAN System 105 transmits its policies (including the appropriate location and temporal context) to the centralized policy store and/or to the Cellular System 125 for use.

In the illustrated environment 100, a UE 120 is communicatively connected to a WLAN system 105 and a Cellular system 125. In embodiments, the UE 120 may be connected to both systems simultaneously, or may be configured to connect to each network in turn (e.g., the UE 120 may only be able to connect to either the WLAN system 105 or the Cellular system 125 at any given time). As illustrated, the WLAN System 105 includes a Policy Engine 108, a WLAN Controller 110, and multiple Access Points 115A-B. Although illustrated as a distinct component, in some embodiments, the functionality of the Policy Engine 108 is implemented by the WLAN Controller 110. Similarly, in embodiments, the functionality of the WLAN Controller 110 may be implemented by a discrete component or device, or may be implemented locally by each Access Point 115, or by one or more intermediate devices (e.g., switches, routers, gateways, and the like).

In an embodiment, the Policy Engine 108 is used to configure and define policies for the WLAN System 105. These policies may include QoS parameters, priority data, and the like. In the illustrated embodiment, the WLAN Controller 110 interfaces with the Access Points 115A-B to configure them for use in the WLAN System 105. Although two Access Points 115A-B are illustrated, in embodiments, the WLAN System 105 may include any number of Access Points 115. In embodiments, the UE 120 connects to the WLAN System 105 via one or more Access Points 115A-B. In an embodiment, the UE 120 then retrieves or receives civic information or location information about the WLAN System 105 and/or the specific Access Point 115. In some embodiments, if the UE 120 and/or the Access Point(s) 115 are configured to support fine timing measurements (FTM), the UE 10A can initiate such FTM to determine its location, relative to the Access Point 115.

In one embodiment, venue information can be provided to the UE 120 by the Access Point 115, such as via 802.11u Generic Advertisement Service (GAS) frame. In some embodiments, although this venue information does not provide location or geographic coordinates, it is sufficient to characterize the location. In one embodiment, civic information (such as geographic coordinates of the WLAN System 105 and/or Access Point 115) can be included by the Access Point 115 as a specific 802.11u Interworking Element (IE) in unicast or broadcast frames sent to the UE 120. Further, in some embodiments, event information is added to the IE. In embodiments, this event information may be in addition to or a replacement for the venue information. For example, in an embodiment, events are represented by keywords (such as "concert" or "keynote"), rather than a generic "venue" such as "convention center." In some embodiments, the event information can also be represented by one or more specific application identifiers that receive special treatment during the particular event (e.g., at the specified location during the specified time).

In an embodiment, once the UE 120 acquires this location and/or event information from the WLAN System 105, the UE 120 communicates this information to the Cellular System 125. In various embodiments, this information can be conveyed to the Cellular Base Station 135 via Location Position Protocol (LPP) (e.g., enhanced LPPa protocol data unit (PDU)), over S1 signaling, or over Radio Resource Control (RRC) signaling. In the illustrated embodiment, the Cellular System 125 includes a Policy Engine 130 and a Cellular Base Station 135 (e.g., an evolved NodeB). Although a single Policy Engine 130 and Cellular Base Station 135 are illustrated, in embodiments, the Cellular System 125 may include any number of Policy Engines 130 and Cellular Base Stations 135. In one embodiment, upon receiving the location information and/or event context from the UE 120, the Cellular System 125 identifies and applies one or more policies based on this data.

In one embodiment, if civic information is unavailable (e.g., because the WLAN System 105 or the Access Point 115 does not support it), the UE 120 collects the Basic Service Set Identifier (BSSID) of the Access Point 115 or WLAN System 105, and transmits it to the Cellular System 125 as discussed above. Additionally, in some embodiments, this information can be communicated to the Access Network Discovery and Selection Function (ANDSF) server over the S14 interface by the UE 120.

In some embodiments, in order for the Cellular System 125 to be made aware of the spatial and temporal context and policies, the Cellular System 125 (e.g., the Cellular Base Station 135) can transmit Packet Convergence Data Protocol (PDCP) PDUs toward the WLAN System 105. These PDUs may be encapsulated in LTE-WLAN Aggregation (LWA) Adaptation Protocol (LWAAP). In one embodiment, this transmission includes a request to the WLAN System 105 to identify itself, to provide the event contexts (e.g., the spatial and temporal contexts), to provide a policy for a given spatiotemporal context, and the like. In one embodiment, in response, the WLAN System 105 (e.g., the Policy Engine 108 and/or the WLAN Controller 110) transmits, to the Cellular System 125, the set of geographic coordinates that are covered by the Wi-Fi deployment.

In another embodiment, the WLAN System 105 only forwards the extended Organizational Unique Identifier (OUI) of the Access Point(s) 115 controlled by the WLAN System 105. Further, in one embodiment, upon connecting to the WLAN System 105, the UE 120 transmits, to the Cellular System 125, the location of the UE 120 (e.g., if acquired via FTM or via other methods through the WLAN System 105), the last known GPS coordinates of the UE 120, and/or the BSSID of the WLAN System 105. Based on this information, in one embodiment, the Cellular System 125 consults a predefined list of known WLAN Systems 105 to which the Cellular System 125 can create connections. The Cellular System 125 can then identify the geographic coverage of the WLAN System 125, and associate a location and contextual value to the UE 120. In this way, the Cellular System 125 is made aware of the location and temporal context that are to be used when handling traffic to or from the UE 120.

In embodiments, based on this context, the Cellular System 125 can identify one or more policies that have temporal and/or contextual significance. In one embodiment, a library of identifiers is configured at Cellular System 125 (e.g., at the Policy Engine 130 or the Cellular Base Station 135), or at a location in the cloud. In some embodiments, each identifier in the library corresponds to a set of applications that are to be treated according to specific policies (e.g., that are to receive specific QoS treatment). Further, in some embodiments, each identifier is associated with one or more location values and/or temporal values for which the differentiated treatment is applicable (e.g., particular times during which the policy should be applied to the UE 120, and/or specific locations that the UE 120 should be in for the policy to be applied).

In an embodiment, when a new policy is configured on the WLAN System 105, the Policy Engine 108 performs a lookup in the library of identifiers, to determine whether the policy is reflected in the library. If needed, a new ID can be created and uploaded, along with a list of the associated applications, and the expected treatment or policy. In some embodiments, upon receiving the location and context from the UE 120, the Cellular System 125 queries the local library of policies to identify the appropriate policy. In another embodiment, the Cellular System 125 identifies and queries the corresponding WLAN System 105 that the UE 120 is connected to, to retrieve policy information associated with the location and context. For example, the Cellular System 125 may request policies applied by the WLAN System 105 when the context indicates that the UE 120 is at a location "Smith Stadium" with an event context of "concert." The received policies can then be applied uniformly to the UE 120.

In another embodiment, upon receiving the indication of the location of the UE 120, the Cellular System 125 fetches contextual information such as venue details (venue type, group, name, size, etc.) using the location coordinates and a cloud-based location server. In one embodiment, the Cellular System 125 can then identify and apply a standard policy or profile for this type of venue at the particular time. For example, if the UE 120 indicates that it is located at "Smith Stadium," the Cellular System 125 can identify a policy that corresponds to "stadiums" at the particular time, and apply such policies.

In some embodiments, the Cellular System 125 applies policies that are aligned with the policies used by the WLAN System 105. For example, if traffic from a particular application is prioritized by the WLAN System 105, in such an embodiment, the Cellular System 125 prioritizes the same traffic. In one embodiment, the Cellular System 125 identifies one or more complementary policies, in order to provide contrasting service. For example, in one embodiment, if the WLAN System 105 prioritizes traffic for a first application at the expense of traffic from a second application, the Cellular System 125 may prioritize traffic for the second application at the expense of traffic for the first application. Thus, embodiments of the present disclosure can be applied to ensure traffic is treated uniformly across disparate networks based on the particular location and temporal context, as well as to ensure that disadvantaged traffic on one network can be prioritized on a second network (e.g., to meet QoS standards).

In one embodiment, the Cellular System 125 is configured to retrieve and apply policies defined and in use by the WLAN System 105 to which the UE 120 is connected. In some embodiments, the WLAN System 105 similarly retrieves and applies policies that are defined and used by the Cellular System 125. Further, although a WLAN System 105 and Cellular System 125 are discussed for illustration, embodiments of the present disclosure are readily applicable to contextual and temporal policy sharing among any number of networks and between any particular types of network.

Figure 2:
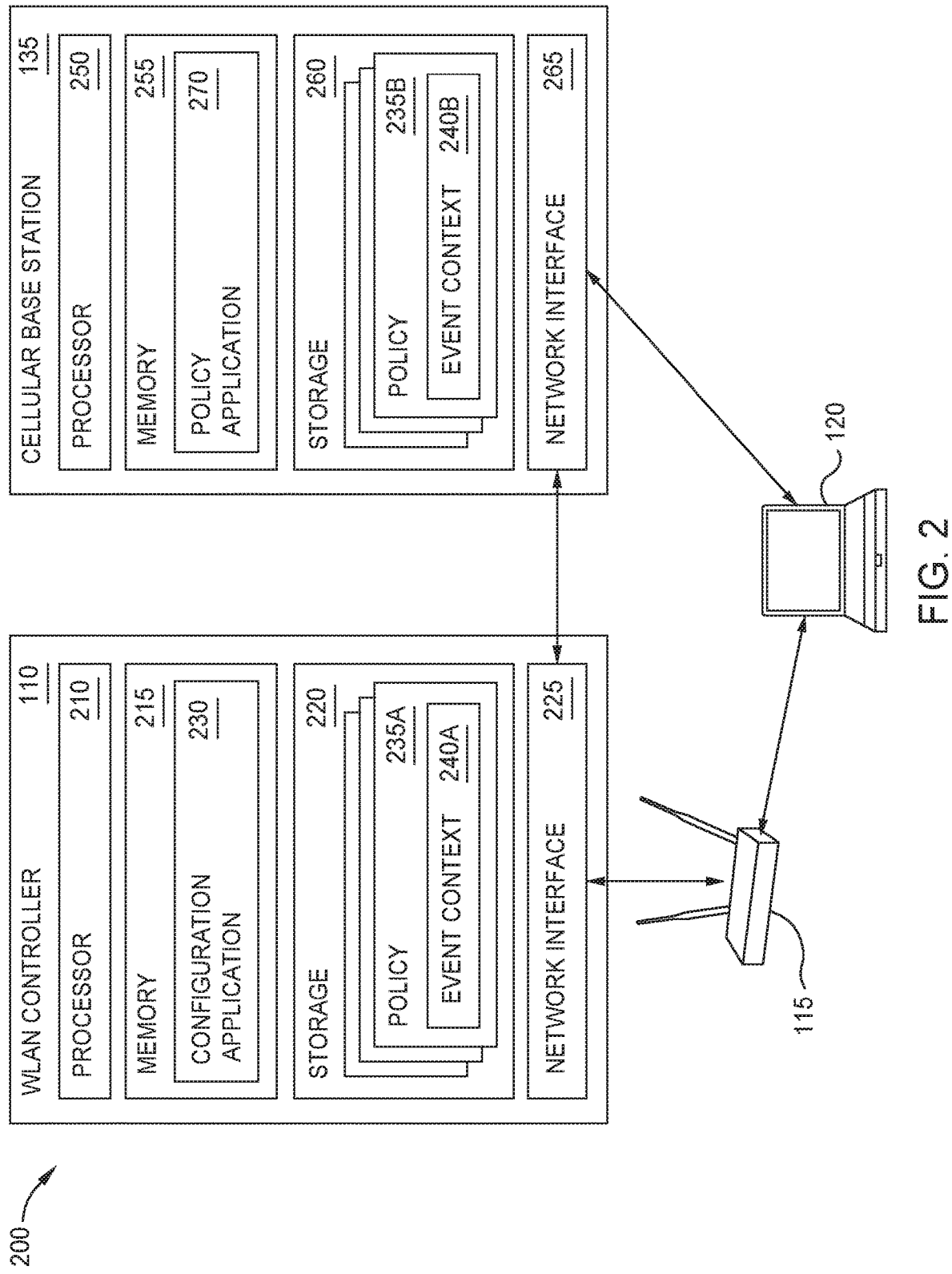
FIG. 2 is a block diagram illustrating an environment including components involved in enforcing spatial and temporal policies and contexts, according to one embodiment disclosed herein.

FIG. 2 is a block diagram illustrating an environment 200 including components involved in enforcing spatial and temporal policies and contexts, according to one embodiment disclosed herein. The illustrated environment 200 includes a WLAN Controller 110 and a Cellular Base Station 135. As illustrated, the environment 200 further includes at least one UE 120, and at least one Access Point 115. As depicted, the WLAN Controller 110 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Via the Network Interface 225, the WLAN Controller 110 can be communicatively coupled with other devices including access points, devices used by administrators to configure the WLAN Controller 110, policy engines, Cellular Base Stations 135, and the like.

As illustrated, the Storage 220 includes a set of Policies 235A, each with a corresponding Event Context 240A. In one embodiment, each Event Context 240A includes a spatial context (e.g., a defined location where the corresponding Policy 235A should be applied) and/or a temporal context (e.g., a defined time during which the corresponding Policy 235A should be applied). Although illustrated as residing in Storage 220, in embodiments, the Policies 235A may be stored in any suitable location, including in Memory 215, in the Policy Engine 108 for the WLAN System 105, on a remote policy engine that serves one or more other WLAN Systems 105 and/or Cellular Systems 125, in a cloud storage location, and the like.

In the illustrated embodiment, the Memory 215 includes a Configuration Application 230. Although illustrated as a program residing in Memory 215, in embodiments, the Configuration Application 230 can be implemented using hardware, software, or a combination of hardware and software, and may be implemented across any number of devices and components. In an embodiment, the Configuration Application 230 is used to configure the Access Point(s) 115. In some embodiments, the Configuration Application 230 is further operable to configure the Policies 235A that are used by the WLAN System 105. In one embodiment an administrator uses the Configuration Application 230 to create and modify Policies 235A, as well as to specify the associated Event Context 240A (e.g., a spatiotemporal context). For example, in an embodiment, an administrator may define a Policy 235A that prioritizes certain types of network traffic, and define the Event Context 240A as to apply the prioritization during weekday evenings or during a particular event and at the location of the event (such as a book signing at a store). In embodiments, the Event Context 240A refers to any spatial and temporal requirements to apply to the Policy 235A. In an embodiment, once a Policy 235A is created, the Configuration Application 230 also enforces it on traffic passing through the WLAN System 105.

In one embodiment, when a UE 120 connects to an Access Point 115, the WLAN Controller 110 and/or the Access Point 115 identifies and applies the appropriate Policy or Policies 235A, based on the corresponding Event Context(s) 240A (e.g., based on the current time, and/or based on the current location of the UE 120). In some embodiments, the Access Point 115 further transmits, to the UE 120, an indication of the location of the Access Point 115 and/or the WLAN System 105 (e.g., via a unique identifier that can be used to search a database to identify the location, or by providing geographic coordinates of the Access Point 115 or WLAN System 105). In one embodiment, the Access Point 115 uses FTM to enable the UE 120 to determine its own location, relative to the Access Point 115. Further, in some embodiments, the Access Point 115 transmits an indication as to any event(s) that are ongoing at the location of the Access Point 115 (or an indication as to the temporal context), which may affect which Policy 235A is applied.

In some embodiments, when Policies 235A are created or modified, the Configuration Application 230 updates the Cellular System 125 (e.g., by updating a centralized policy repository, or by transmitting an updated policy to a policy engine used by the Cellular System 125 and/or to one or more Cellular Base Station(s) 135). In other embodiments, the Configuration Application 230 transmits updated Policies 235A to the Cellular Base Station 135 upon request, as discussed below in more detail.

As illustrated, the Cellular Base Station 135 includes a Processor 250, a Memory 255, Storage 260, and a Network Interface 265. In the illustrated embodiment, Processor 250 retrieves and executes programming instructions stored in Memory 255 as well as stores and retrieves application data residing in Storage 260. Processor 250 is representative of a single CPU, multiple CPUs, a single CPU having multiple processing cores, and the like. Memory 255 is generally included to be representative of a random access memory. Storage 260 may be a disk drive or flash-based storage device, and may include fixed and/or removable storage devices, such as fixed disk drives, removable memory cards, or optical storage, network attached storage (NAS), or storage area-network (SAN). Via the Network Interface 265, the Cellular Base Station 135 can be communicatively coupled with other devices including WLAN Controllers 110, UE 120, devices used by administrators to configure the Cellular Base Station 135, policy engines, and the like.

As illustrated, the Storage 260 includes a set of Policies 235B, each with a corresponding Event Context 240B. In one embodiment, similarly to the Event Context 240A associated with each Policy 235A, each Event Context 240B includes a spatial context (e.g., a defined location where the corresponding Policy 235B should be applied) and/or a temporal context (e.g., a defined time during which the corresponding Policy 235B should be applied). Although illustrated as residing in Storage 260, in embodiments, the Policies 235B may be stored in any suitable location, including in Memory 265, in the Policy Engine 130 for the Cellular System 125, on a remote policy engine that serves one or more WLAN Systems 105 and/or other Cellular Systems 125, in a cloud storage location, and the like.

In some embodiments, some or all of the Policies 235B are defined for the Cellular System 125 (e.g., by an administrator of the Cellular System 125). In one embodiment, these Policies 235B can be shared with WLAN Systems 105 as needed, to ensure the WLAN System 105 enforces the same policies as the Cellular System 125. In one embodiment, the Policies 235B include copies of Policies 235A that are used by the WLAN System 105, such that the Cellular System 125 can implement corresponding policies over the cellular link. In the illustrated embodiment, the Memory 255 includes a Policy Application 270. Although illustrated as a program residing in Memory 255, in embodiments, the Policy Application 270 can be implemented using hardware, software, or a combination of hardware and software, and may be implemented across any number of devices and components.

In an embodiment, when the UE 120 connects to a Cellular Base Station 135, the Policy Application 270 requests (or receives) the location or civic information from the UE 120. In some embodiments, the Cellular Base Station 135 receives the event context from the UE 120. In one embodiment, in addition to or rather than receiving this location, civic information, and/or event information, the Cellular Base Station 135 receives, from the UE 120, the BSSID to which the UE 120 is connected. In an embodiment, in order to identify the event context, the Cellular Base Station 135 (e.g., the Policy Application 270) uses the BSSID to identify the WLAN System 105, and transmits, to the WLAN Controller 110, a request. In embodiments, this request can use, for example, Packet Convergence Data Protocol (PDCP) Protocol Data Units (PDUs) over the standard interface (Xw). In one embodiment, the PDUs can be encapsulated using LTE-WLAN Aggregation Protocol (LWAAP).

In one embodiment, in response to this request, the WLAN Controller 110 (e.g., the Configuration Application 230) transmits, to the Cellular Base Station 135, the set of geographical coordinates that are covered by the Wi-Fi deployment. In some embodiments, in addition to or instead of forwarding these geographic coordinates, the Configuration Application 230 transmits an indication of the extended Organizational Unique Identifiers (OUIs) of the Access Points 115 that are controlled by the WLAN Controller 110 (e.g., aa:bb:cc:de:xx:xx, aab:bcc:de0.000, etc.). That is, in one embodiment, it is expected that a given site utilizes Access Points 115 purchased in bulk from a given vendor. In such an embodiment, the list of Access Point 115 extended OUI may be less than the total number of Access Points 115 in a given site. In an embodiment, the OUI (or a subset thereof) can be used to identify the site (e.g., using a predefined list of OUIs). In some embodiments, when the UE 120 associates to the WLAN System 105, the UE 120 also transmits, to the Cellular Base Station 135 (e.g., over the control interface), its last known location (if obtained from the WLAN System 105 using, for example, FTM). Additionally, in one embodiment, the UE 120 transmits its last known GPS location, if available.

In some embodiments, based on the received information the Policy Application 270 consults a predefined list of known WLAN Systems 105 with which the Cellular Base Station 135 can create a connection (e.g., through the standard Xw interface) to identify their geographical coverage, or to compare the received BSSID to the list of extended OUIs returned by the WLAN Controller 110. Based on this list, the Policy Application 270 can therefore identify a location and contextual value for the UE 120 (e.g., an event context).

In embodiments, the Policy Application 270 can determine the appropriate policy or policies to apply in a variety of ways. In one embodiment, the Policy Application 270 can use the received or determined location information or event context to retrieve the Quality of Service (QoS) or other policies (e.g., from a policy server or engine shared by the WLAN System 105 and Cellular System 125) that are active for the specific location and time. In some embodiments, in addition to or rather than using a shared remote policy engine, the Policy Application 270 maintains a library of identifiers (e.g., the Policies 235B), where each identifier corresponds to a set of applications that are to receive specific QoS treatments (or other policy requirements). In an embodiment, each identifier is associated with one or more geographic location values where the policy or differentiated treatment is to be applied, and/or one or more temporal restrictions regarding when the policy is to be applied.

In some embodiments, when the Configuration Application 230 configures a Policy 235A, a lookup is performed to determine which identifier in the Policies 235B match the intended differentiated treatment (or other policy). If needed, a new identifier can be created and uploaded to the Storage 260. In such an embodiment, the Policy Application 270 can identify the appropriate Policy 235B based on the received or determined event context. In one embodiment, upon determining the UE 120 location and context, the Policy Application 270 queries the policy server associated with the WLAN System 105 to retrieve the appropriate policy information associated with the location and context. For example, if the UE 120 is located in "Smith Stadium" and the event is a particular concert, the Policy Application 270 can request, from the WLAN System 105, the appropriate policy for the event context: "Smith Stadium and concert."

In another embodiment, the Policy Application 270 and Configuration Application 230 can exchange addition/modification messages to update the temporal/spatial policy context. For example, in its response, the WLAN Controller 110 can communicate additional temporal and/or spatial venue identify information, policy values, and the like. In some embodiments, the Policy Application 270 can utilize standard or default policies, based on the spatiotemporal context of the UE 120. For example, in one embodiment, upon determining the location of the UE 120, the Policy Application 270 fetches other contextual information (such as venue details including type of venue, group, name, size, and the like) by using the location coordinates and a cloud-based location server. In such an embodiment, the Policy Application 270 can then use the standard policy for the type of venue at the particular point in time.

Additionally, in one embodiment, an ANDSF client is configured on the Cellular Base Station 135, and the client can obtain the venue temporal QoS information about various WLAN Systems 105 (e.g., through the S14 interface). In such an embodiment, the ANDSF Managed Object (MO) Inter-System Mobility Policy (ISMP) and/or Inter-System Routing Policy (ISRP) rules can be enhanced to include venue-related information such as venue group, venue type, and venue name for the WLAN System 105. In an embodiment, the client can then provide updated information about the current policies that are valid for the location, each time it is queried.

Further, in one embodiment, the UE 120 can record Differentiated Services Code Point (DSCP) markings and application identifiers for traffic forwarded by the WLAN System 105. This information can then be returned to the Policy Application 270 and/or the ANDSF server, along with standard metric values for each application (e.g., bandwidth, delay, jitter, and the like). The policy server used by the Cellular System 125 can then compare the marking(s) observed by the client to the expected markings for the client location (e.g., based on prior policy communication procedures) and determine if deviations from the expectations indicate that temporal policy changes are being implemented by the WLAN, and are therefore required on the cellular link.

In embodiments, based on the WLAN policy and/or event context determined or received by the Policy Application 270, the Policy Application 270 can adjust the policies applied on the cellular link accordingly. For example, in one embodiment, the Policy Application 270 enforces similar or identical policies to those used by the WLAN System 105 (e.g., for load-balancing purposes, so that privileged or restricted applications on the Wi-Fi link receive the same temporal adjustments on the cellular link, and the like). In some embodiments, the Policy Application 270 determines a complementary policy that does not match the policy or policies used by the WLAN System 105. For example, the Policy Application 270 may use a policy to provide link conditions that are denied on the WLAN link (e.g., prioritizing applications that are pushed to the background or deprioritized on the WLAN link). Similarly, in one embodiment, the Policy Application 270 can restrict or deprioritize traffic that is privileged or prioritized by the policy in use by the WLAN System 105.

Figure 3:
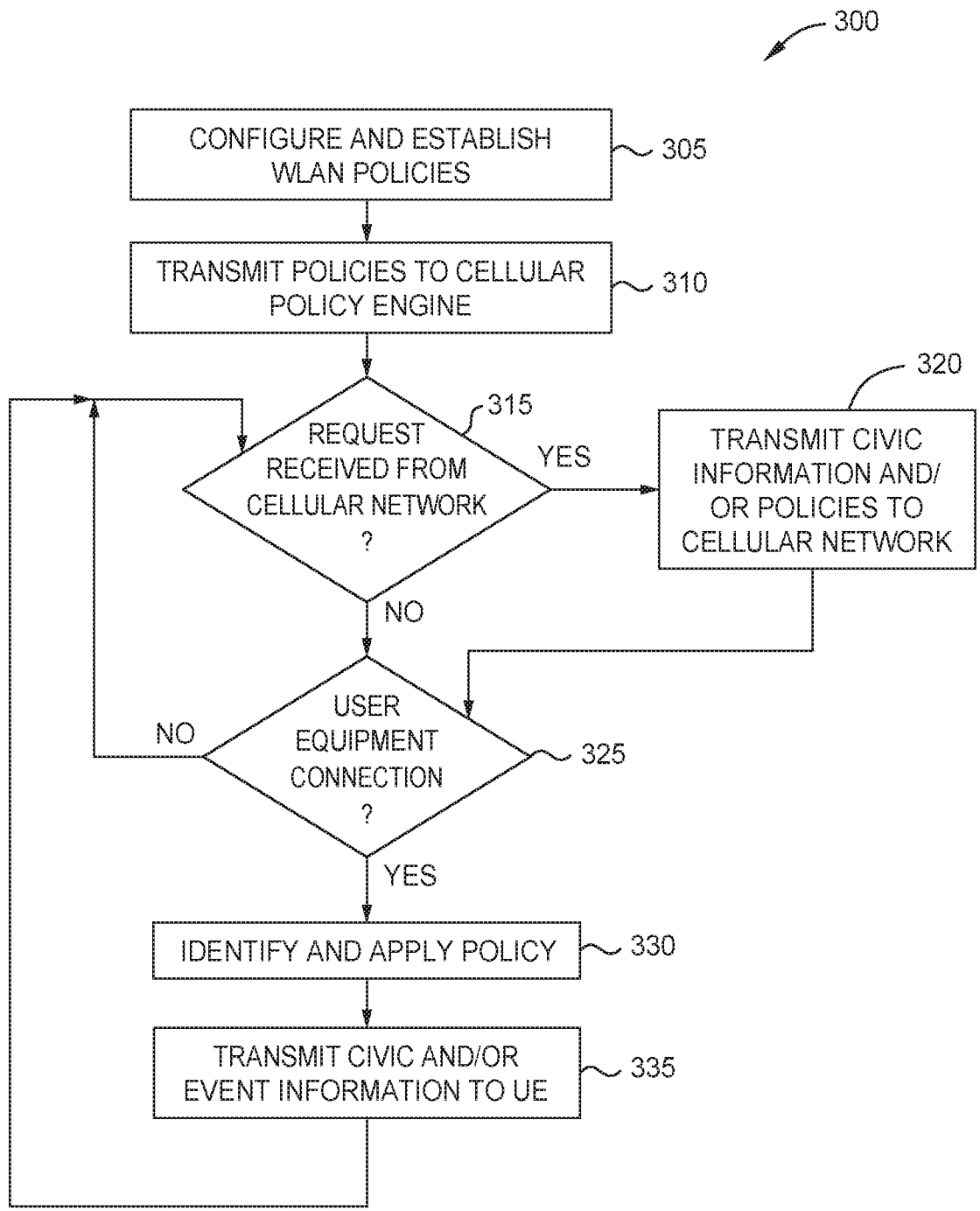
FIG. 3 is a flow diagram illustrating a method for configuring, enforcing, and sharing temporal and geographic or spatial policies, according to one embodiment disclosed herein.

FIG. 3 is a flow diagram illustrating a method 300 for configuring, enforcing, and sharing temporal and geographic or spatial policies, according to one embodiment disclosed herein. In the illustrated embodiment, the method 300 depicts the use and sharing of spatiotemporal policies from the perspective of the WLAN System 105. The method 300 begins at block 305, where the WLAN System 105 (e.g., a Policy Engine 108, WLAN Controller 110, and/or Configuration Application 230) configures and establishes one or more policies for the WLAN link. In an embodiment, each of these policies can be associated with a specific context, including a spatial or location context, a temporal context, an event context, and the like. The method 300 then proceeds to block 310.

At block 310, the WLAN Controller 110 transmits an identification of any newly configured (or modified) policies to the policy engine used by the cellular system. For example, in one embodiment, the WLAN Controller 110 determines whether the policy is already reflected in a library or store used by the Cellular System 125. If not, the WLAN Controller 110 transmits the policy and relevant context to the Cellular System 125. In an embodiment, the Cellular System 125 can then update its policy store to reflect the new or modified policy or policies, as well as their corresponding contexts. The method 300 then proceeds to block 315, where it is determined whether the WLAN Controller 110 has received a request from one or more cellular networks (e.g., requests to provide civic/geographic information, venue/event information, policy information, and the like).

If so, the method 300 proceeds to block 320, where the WLAN Controller 110 responds to the request by transmitting, to the Cellular System 125, the requested information. As discussed above, in embodiments, this information can include, for example, civic information, geographic coordinates, information about the venue or events occurring (or scheduled to occur) at the location, policies currently in effect, and the like. The method 300 then proceeds to block 325. Returning to block 315, if the WLAN Controller 110 determines that no request has been received, the method 300 also proceeds to block 325.

At block 325, the WLAN Controller 110 determines whether user equipment has connected or associated to the WLAN System 105. If not, the method 300 returns to block 315, to monitor for requests from the Cellular System 125. If a user equipment has connected, the method 300 continues to block 330, where the WLAN Controller 110 identifies the appropriate policy (given the current time, as well as the location of the UE 120), and applies it to the WLAN link. At block 335, the WLAN Controller 110 transmits, to the connected UE 120, civic information (e.g., geographic coordinates) and/or event context. In some embodiments, as discussed above, the UE 120 forwards this information to the Cellular System 125. Further, in some embodiments, the UE 120 transmits the BSSID of the WLAN it is connected to. Additionally, in one embodiment, the UE 120 uses FTM with the WLAN System 105, and similar transmits this information to the Cellular System 125. The method 300 then returns to block 315, to monitor for additional requests or connections.

Figure 4:
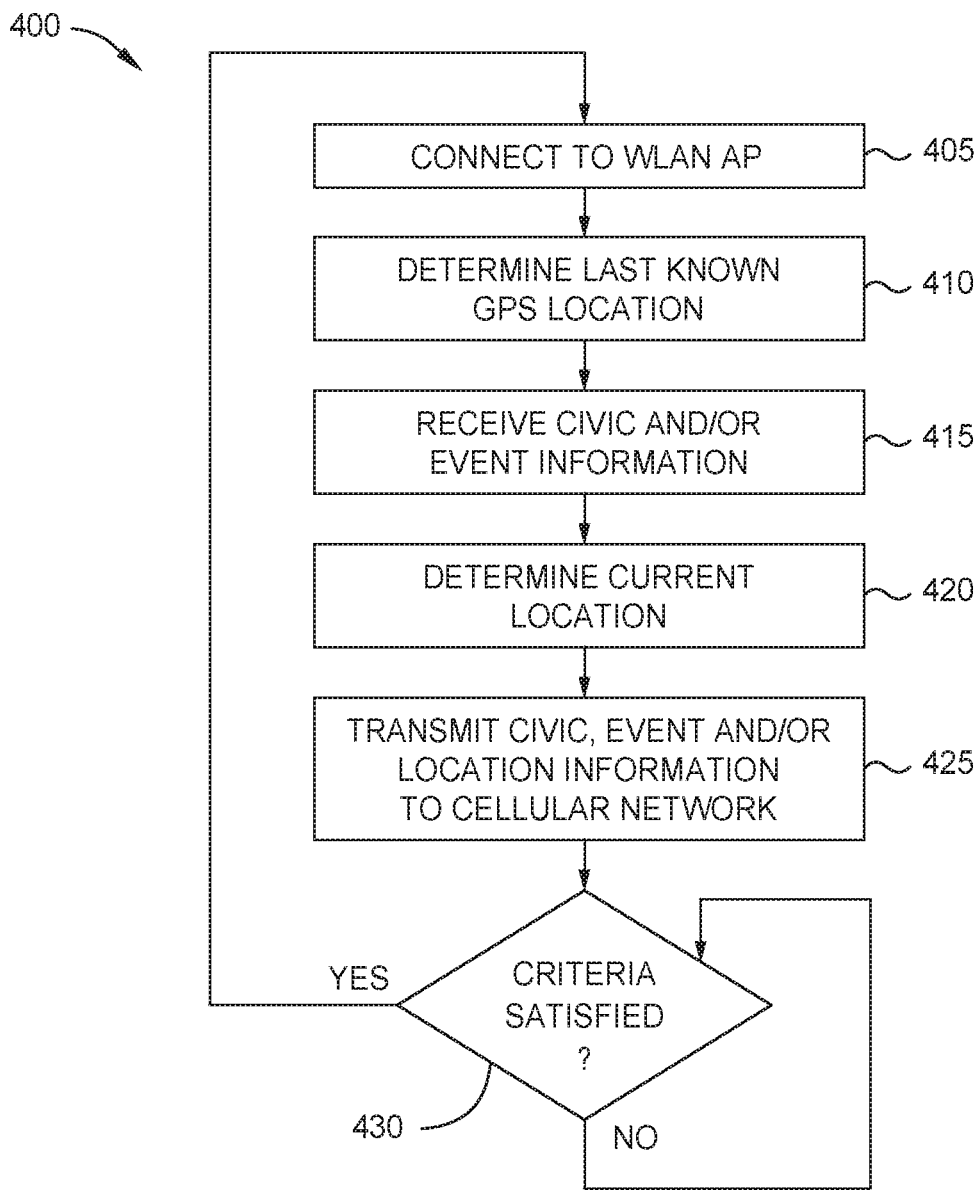
FIG. 4 is a flow diagram illustrating a method for enforcing and sharing temporal and geographic or spatial policies, according to one embodiment disclosed herein.

FIG. 4 is a flow diagram illustrating a method 400 for enforcing and sharing temporal and geographic or spatial policies, according to one embodiment disclosed herein. In the illustrated embodiment, the method 400 depicts the use and sharing of spatiotemporal policies from the perspective of the UE 120. As illustrated, the method 400 begins at block 405, where the UE 120 connects to an Access Point 115 of a WLAN System 105. At block 410, the UE 120 determines its last-known location via GPS. (e.g., its current GPS location, or the location of the UE 120 at the last point in time where a sufficiently accurate or reliable location could be determined via GPS). The method 400 then proceeds to block 415.

At block 415, the UE 120 receives civic information (e.g., a geographic location) and/or event information (e.g., a spatiotemporal context such as a time during which the event is occurring, or a particular policy is applicable) from the WLAN System 105. At block 420, the UE 120 optionally determines its current location (e.g., based on the location of the WLAN System 105 and/or the individual Access Point 115 to which the UE 120 is connected, by using FTM, and the like). The method 400 then proceeds to block 425, where the UE 120 transmits the gathered and determined information to the cellular network (e.g., to the Cellular Base Station 135). Based on this information, the Cellular System 125 can identify and apply one or more policies that align with the policies used by the WLAN System 105 and/or one or more policies that complement or contrast with those used by the WLAN System 105.

The method 400 continues to block 430, where the UE 120 determines whether predefined criteria are satisfied. In various embodiments, this determination may include, for example, determining whether a predefined period of time has passed, or whether the UE 120 has moved a predefined distance, since the UE 120 requested or received updated civic and/or contextual information. In one embodiment, the criteria include a determination as to whether the received event information (e.g., spatial and temporal context) is still applicable (e.g., whether the UE 120 is still within the identified area, and/or whether the identified time is still ongoing). In some embodiments, the criteria include determining whether the UE 120 is still connected to the initial Access Point 115 (or connected to the WLAN System 105 at all). Additionally, in some embodiments, the WLAN System 105 pushes updated context to the UE 120 as appropriate, rather than waiting for the UE 120 to request it. If the criteria have not been satisfied, the method 400 loops at block 430. If, however, the UE 120 determines that the criteria are satisfied, the method 400 returns to block 405, to begin the method again (e.g., to determine the new or updated context).

Figure 5:
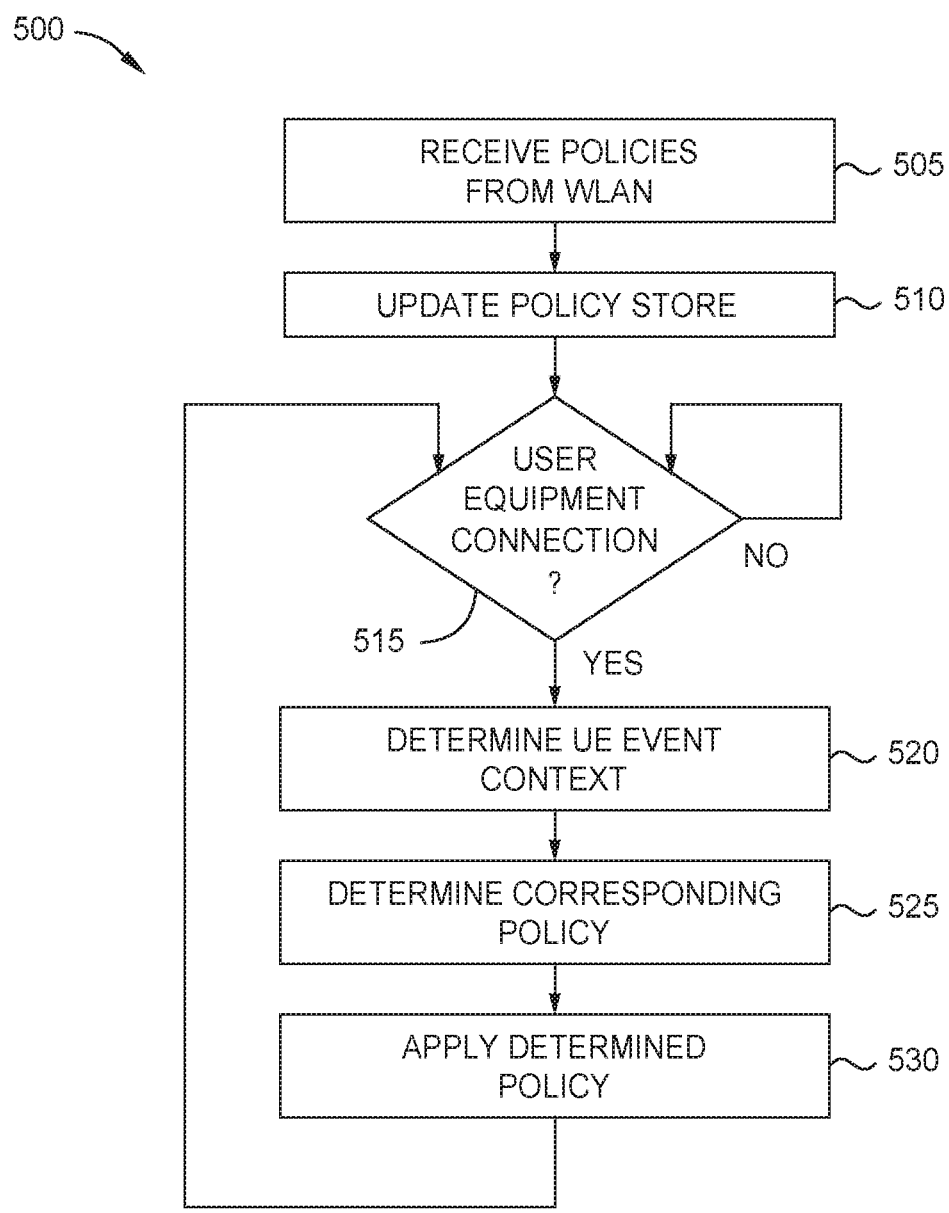
FIG. 5 is a flow diagram illustrating a method for configuring, enforcing, and sharing temporal and geographic or spatial policies, according to one embodiment disclosed herein.

FIG. 5 is a flow diagram illustrating a method 500 for configuring, enforcing, and sharing temporal and geographic or spatial policies, according to one embodiment disclosed herein. In the illustrated embodiment, the method 500 depicts the use and sharing of spatiotemporal policies from the perspective of the Cellular System 125. The method 500 begins at block 505, where a Cellular System 125 receives one or more policies from one or more WLAN Systems 105. In one embodiment, some or all of these policies are associated with corresponding contexts (e.g., spatiotemporal or event contexts). In one embodiment, the WLAN System 105 transmits new or modified policies whenever they are configured on the WLAN System 105. In some embodiments, the WLAN System 105 transmits these policies upon receiving a policy request from the Cellular System 125. The method 500 then proceeds to block 510, where the Cellular System 125 updates its policy store (e.g., the Policy Engine 130) based on the received policies and contexts.

The method 500 then continues to block 515, where the Cellular System 125 determines whether user equipment has connected to a WLAN System 105. In one embodiment, the Cellular System 125 makes this determination based on receiving, from the UE 120, an indication that it has associated with a WLAN System 105. In some embodiments, even if the UE 120 is not currently connected to a WLAN System 105, the Cellular System 125 nevertheless determines the location and/or context of the UE 120, and applies appropriate policies. In such an embodiment, the Cellular System 125 can prevent users from bypassing the WLAN policies by disconnecting from the network. In other embodiments, the Cellular System 125 only enforces such policies for as long as the UE 120 remains connected to the WLAN System 105 (and subject to its policies).

If the UE 120 has not connected to a WLAN System 105 (or has not connected to a new Access Point 115 or new WLAN System 105), the method 500 loops at block 515. If, however, the Cellular System 125 determines that the applicable context for the UE 120 has changed (e.g., because it has connected to a new system, or because it has transmitted such an indication to the Cellular System 125), the method 500 proceeds to block 520, where the Cellular System 125 determines the event context associated with the UE 120. In embodiments, this may include determining the geographic coordinates that the WLAN System 105 covers, the location of the UE 120 (e.g., based on GPS or FTM), any ongoing events at the location (e.g., based on the provided spatiotemporal context), and the like.

The method 500 then proceeds to block 525, where the Cellular System 125 determines a corresponding policy to apply, based on the received or determined spatiotemporal context of the UE 120. As discussed above, in embodiments, this may include querying the WLAN System 105 or an intermediary policy engine based on the context, searching a local policy store using the context, identifying a generic or standardized policy based on the context, and the like. Additionally, in embodiments, the determined policy may be one that aligns with the policies being enforced by the WLAN System 105, policies that complement or contrast with the WLAN policies, and the like. The method 500 then proceeds to block 530, where the Cellular System 125 enforces or applies the identified policies over the cellular link. The method 500 then returns to block 515, to continually check for new spatiotemporal contexts that may require new policies.

Figure 6:
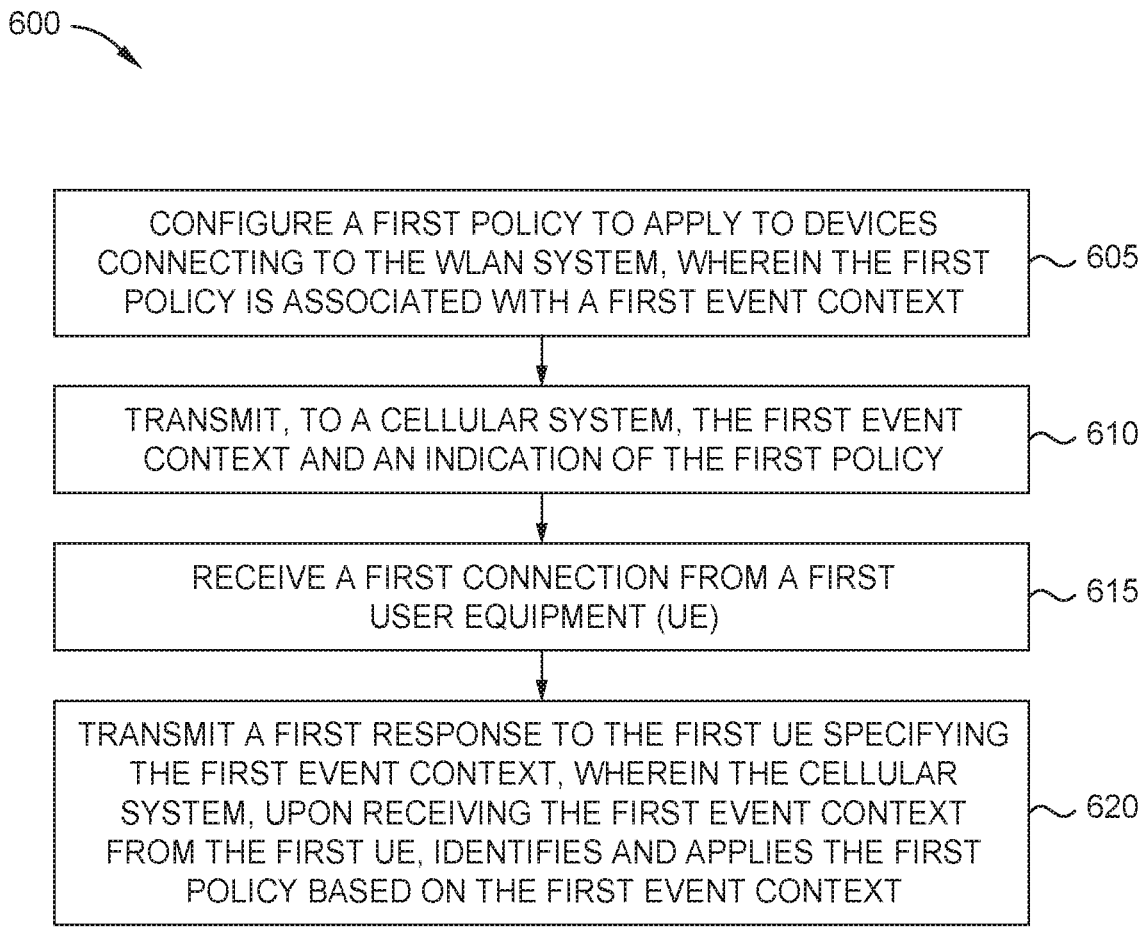
FIG. 6 is a flow diagram illustrating a method of enforcing and sharing event-based policies, according to one embodiment disclosed herein.

FIG. 6 is a flow diagram illustrating a method 600 of enforcing and sharing event-based policies, according to one embodiment disclosed herein. The method 600 begins at block 605, where a WLAN System 105 configures a first policy to apply to devices connecting to the WLAN system 105, wherein the first policy is associated with a first event context. At block 610, the WLAN System 105 transmits, to a cellular system, the first event context and an indication of the first policy. The method 600 then continues to block 615, where the WLAN System 105 receives a first connection from a first user equipment (UE). Finally, at block 620, the WLAN System 105 transmits a first response to the first UE specifying the first event context, wherein the cellular system, upon receiving the first event context from the first UE, identifies and applies the first policy based on the first event context.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   configuring, by a wireless local area network (WLAN) system, a first policy to apply to devices connecting to the WLAN system, wherein the first policy is associated with a first event context and controls how network traffic is handled in the WLAN;
   transmitting, by the WLAN system, to a cellular system, the first event context and an indication of the first policy controlling how network traffic is handled in the WLAN;
   receiving, by the WLAN system, a first connection from a first user equipment (UE); and
   transmitting, by the WLAN system, a first response to the first UE specifying the first event context, wherein the cellular system, upon receiving the first event context from the first UE, identifies and applies the first policy based on the first event context by handling network traffic in the cellular system in a corresponding manner to how network traffic is handled in the WLAN.

2. The method of claim 1, wherein the first event context specifies a time of an event at a geographic location of the WLAN system, wherein the first policy is to be applied during the specified time.

3. The method of claim 2, wherein the first event context further specifies the geographic location of the WLAN system.

4. The method of claim 1, the method further comprising transmitting, by the WLAN system, one or more fine timing measurement (FTM) frames to the first UE.

5. The method of claim 1, wherein the first UE transmits the first event context to the cellular system using at least one of the following: (i) location positioning protocol (LPP), (ii) S1 signaling, and (iii) radio resource control (RRC) signaling.

6. The method of claim 1, the method further comprising:
   configuring, by the WLAN system, a second policy associated with a second event context;
   determining, by the WLAN system, a third policy that is complimentary to the second policy; and
   transmitting, by the WLAN system, to the cellular system, the second event context and an indication of the third policy.

7. The method of claim 1, the method further comprising:
   receiving, by the WLAN system, from the cellular system, a request for a location of the WLAN system; and
   transmitting, by the WLAN system, to the cellular system, an indication of the location of the WLAN system.

8. The method of claim 1, the method further comprising:
   receiving, at the WLAN system, from the cellular system, a request for updated policy information; and
   transmitting, from the WLAN system, to the cellular system, a set of policies, wherein each respective policy in the set of policies is associated with a respective event context.

9. A computer product comprising logic encoded in a non-transitory medium, the logic executable by operation of one or more computer processors to perform an operation comprising:
   configuring, by a first network system, a first policy to apply to devices connecting to the first network system, wherein the first policy is associated with a first event context and controls how network traffic is handled in the WLAN;
   transmitting, by the first network system, to a second network system, the first event context and an indication of the first policy controlling how network traffic is handled in the WLAN;
   receiving, by the first network system, a first connection from a first user equipment (UE); and
   transmitting, by the first network system, a first response to the first UE specifying the first event context, wherein the second network system, upon receiving the first event context from the first UE, identifies and applies the first policy based on the first event context by handling network traffic in the cellular system in a corresponding manner to how network traffic is handled in the WLAN.

10. The computer product of claim 9, wherein the first network system is a wireless local area network (WLAN) system and the second network system is a cellular system.

11. The computer product of claim 9, wherein the first event context specifies a time of an event at a geographic location of the first network system and further specifies the location of the first network system, wherein the first policy is to be applied during the specified time.

12. The computer product of claim 9, the operation further comprising:
configuring, by the first network system, a second policy associated with a second event context;
determining, by the first network system, a third policy that is complimentary to the second policy; and
transmitting, by the first network system, to the second network system, the second event context and an indication of the third policy.

13. The computer product of claim 9, the operation further comprising:
receiving, by the first network system, from the second network system, a request for a location of the first network system; and
transmitting, by the first network system, to the second network system, an indication of the location of the first network system.

14. The computer product of claim 9, operation further comprising:
receiving, at the first network system, from the second network system, a request for updated policy information; and
transmitting, from the first network system, to the second network system, a set of policies, wherein each respective policy in the set of policies is associated with a respective event context.

15. A system comprising:
one or more computer processors; and
logic encoded in a non-transitory medium, the logic executable by operation of the one or more computer processors to perform an operation comprising:
configuring, by a wireless local area network (WLAN) system, a first policy to apply to devices connecting to the WLAN system, wherein the first policy is associated with a first event context and controls how network traffic is handled in the WLAN;
transmitting, by the WLAN system, to a cellular system, the first event context and an indication of the first policy controlling how network traffic is handled in the WLAN;
receiving, by the WLAN system, a first connection from a first user equipment (UE); and
transmitting, by the WLAN system, a first response to the first UE specifying the first event context, wherein the cellular system, upon receiving the first event context from the first UE, identifies and applies the first policy based on the first event context by handling network traffic in the cellular system in a corresponding manner to how network traffic is handled in the WLAN.

16. The system of claim 15, wherein the first event context specifies a time of an event at a geographic location of the first network system and further specifies the location of the first network system, wherein the first policy is to be applied during the specified time.

17. The system of claim 15, the operation further comprising transmitting, by the WLAN system, one or more fine timing measurement (FTM) frames to the first UE.

18. The system of claim 15, the operation further comprising:
configuring, by the WLAN system, a second policy associated with a second event context;
determining, by the WLAN system, a third policy that is complimentary to the second policy; and
transmitting, by the WLAN system, to the cellular system, the second event context and an indication of the third policy.

19. The system of claim 15, the operation further comprising:
receiving, by the WLAN system, from the cellular system, a request for a location of the WLAN system; and
transmitting, by the WLAN system, to the cellular system, an indication of the location of the WLAN system.

20. The system of claim 15, the operation further comprising:
receiving, at the WLAN system, from the cellular system, a request for updated policy information; and
transmitting, from the WLAN system, to the cellular system, a set of policies, wherein each respective policy in the set of policies is associated with a respective event context.

* * * * *

UNITED STATES PATENT AND TRADEMARK OFFICE
CERTIFICATE OF CORRECTION

PATENT NO. : 11,044,160 B2
APPLICATION NO. : 16/362498
DATED : June 22, 2021
INVENTOR(S) : Jerome Henry et al.

Page 1 of 1

It is certified that error appears in the above-identified patent and that said Letters Patent is hereby corrected as shown below:

On the Title Page

Item (57), in Column 2, in "Abstract", Line 8, delete "The" and insert -- the --, therefor.

In the Specification

In Column 3, Line 54, after "also" insert -- be --.

In Column 4, Line 39, delete "UE 10A" and insert -- UE 120 --, therefor.

In Column 4, Lines 65-66, delete "Location Position Protocol (LPP)" and insert -- LTE Positioning Protocol (LPP) --, therefor.

In Column 5, Line 23, delete "Convergence Data" and insert -- Data Convergence --, therefor.

In Column 9, Line 9, delete "Convergence Data" and insert -- Data Convergence --, therefor.

In Column 9, Line 11, delete "standard interface (Xw)" and insert -- standardized interface (Xw) --, therefor.

In Column 9, Line 41, delete "standard Xw interface" and insert -- standardized Xw interface --, therefor.

In the Claims

In Column 16, Line 14, in Claim 5, delete "location positioning protocol (LPP)" and insert -- LTE positioning protocol (LPP) --, therefor.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*